Feb. 19, 1957 B. VER NOOY 2,782,407
POSITION INDICATOR FOR PIPE SCRAPER
Filed Dec. 22, 1953 4 Sheets-Sheet 3
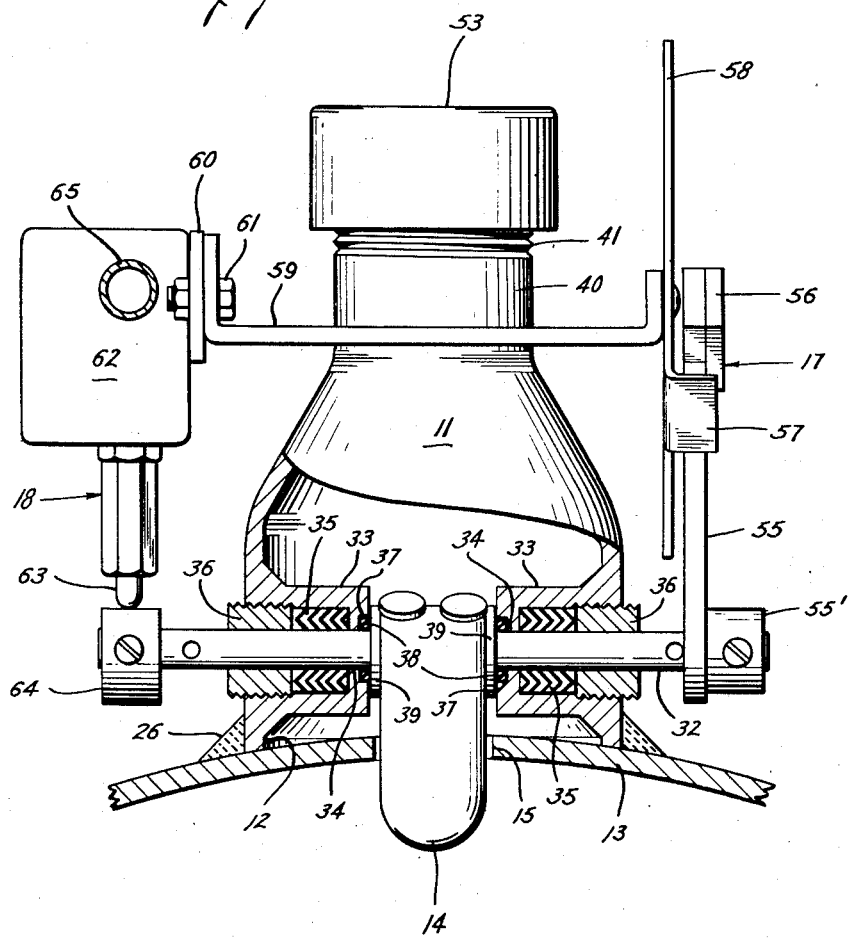
Burton Ver Nooy
INVENTOR.
BY
Browning, Simms & Ayer
ATTORNEYS

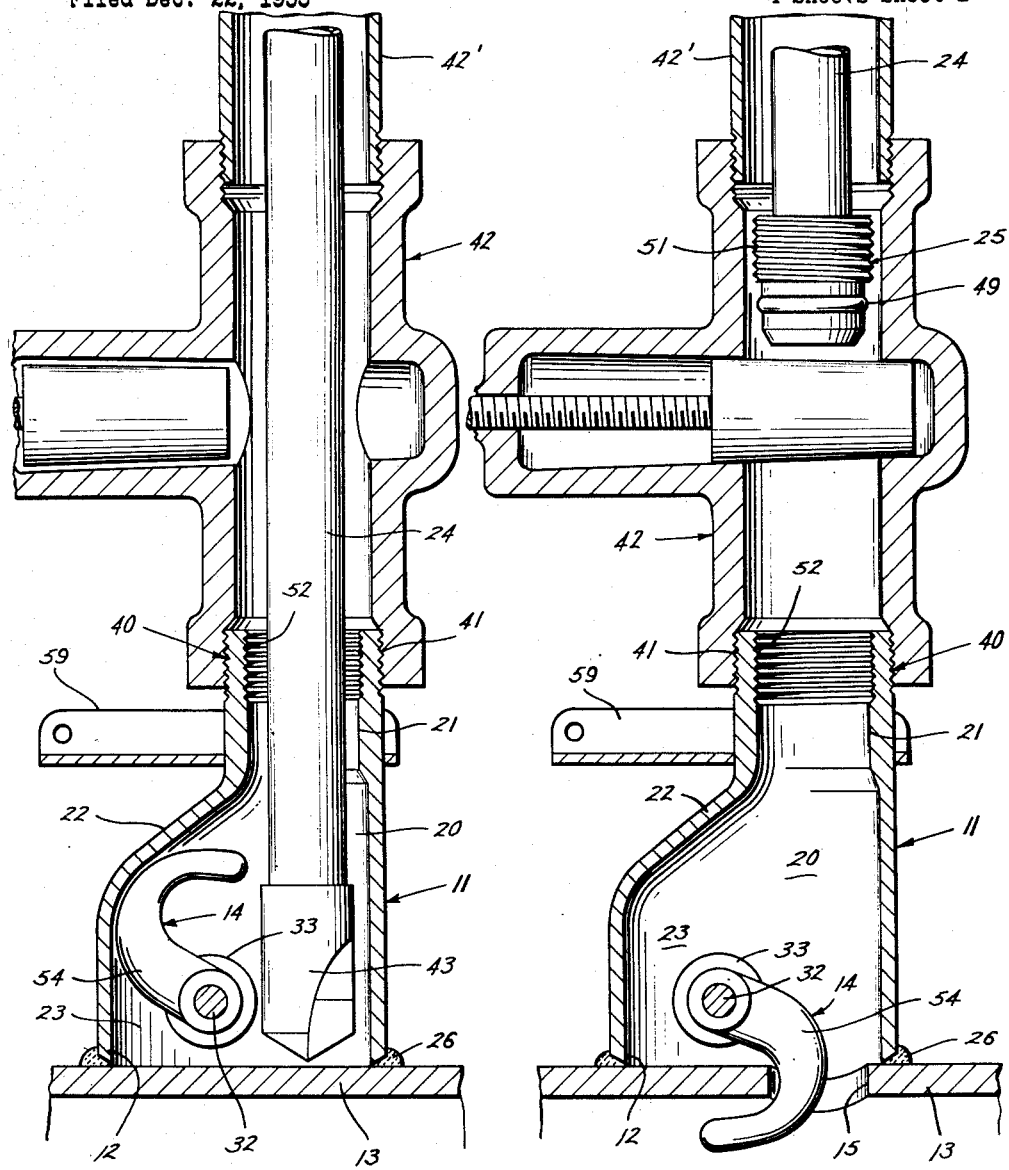

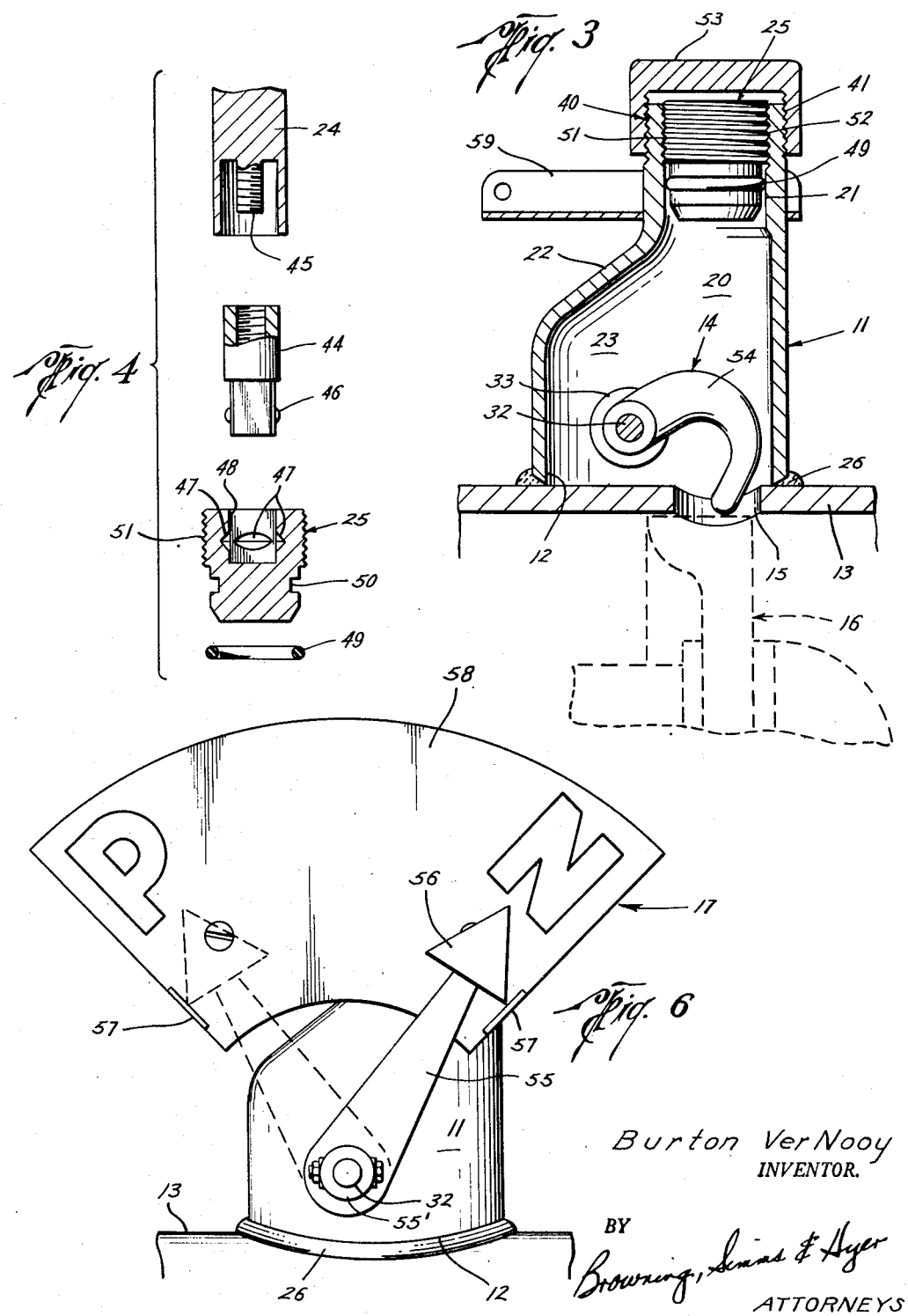

United States Patent Office 2,782,407
Patented Feb. 19, 1957

2,782,407

POSITION INDICATOR FOR PIPE SCRAPER

Burton Ver Nooy, Tulsa, Okla., assignor to T. D. Williamson, Inc., Tulsa, Okla., a corporation of Oklahoma Application December 22, 1953, Serial No. 399,777

9 Claims. (Cl. 340—282)

This invention relates broadly to apparatus for indicating the movement of a body past a predetermined point along a conduit. In one of its novel aspects, it relates to apparatus especially well suited for indicating the passage of a body adapted to be moved in sliding engagement with the inner wall of a pipeline. According to another of its novel aspects, the indicating apparatus of this invention is so constructed as to permit its installation on a pipeline in the field without interrupting operation of the line.

In the pipeline industry, cleaning devices known as scrapers are moved through a pipeline to scrape deposits from the inner wall thereof. In order to insure an efficient scraping action, the scrapers are provided with wire bristles or the like which tightly engage the pipeline wall. It is also common practice in the industry to employ cups which are adapted to form sliding seals with the inner pipeline wall for separating two or more fluids being conveyed within the line. For this or similar purposes, the cup may extend transversely across the inner diameter of the pipeline and be provided with flexible lip seals for engagement therewith.

It will be understood, of course, that there are many instances in which it is desirable to determine the movement of the scraper, cup, or other body, past a given point along the pipeline in order to at least approximately locate the body between this point and a next succeeding given point. As an example, during a pipeline cleaning operation, it may be desired to know when the scraper passes a certain station along the line, whereby a section only of the line may be shut down to permit removal of the device. Obviously, of course, in the case of the sliding cup seals, the movement thereof past a predetermined point of the pipeline will at least approximately indicate the progress of the fluid in front of the cup.

For use with scrapers or other cleaning devices, indicating apparatus of the type heretofore known in the art has comprised an enclosed freely swinging member disposable in the path of the scraper within the pipeline and operably connected to an externally observable signal means for indicating when the freely swinging member is engaged by the device. However, with indicators of this type, of which Patent No. 2,371,251 to David U. Mauldin is illustrative, the swinging member is not movable out of the pipeline and a scraper has to be forced therepast. In this manner, the bristles or like scraping elements on the device may be permanently distorted or otherwise damaged and thus prevent proper cleaning of the rest of the pipeline. Also, if such an apparatus were used in indicating the passage of a cup seal, the sliding seal would be lost and commingling of the separated fluids result.

Also, such an indicator may not be installed upon the pipeline, at least not as a field operation, without loss of pressure or fluid in the line, unless it is first shut down. Such a loss is inherent in the construction of the prior art indicators which necessitate opening the line to atmospheric pressure exteriorly thereof to permit a freely swinging member to be suspended into position within the pipeline.

It is a primary object of the present invention to provide indicating apparatus of the general character described which will obviate one or both of the aforementioned difficulties.

It is another object of this invention to provide improved indicating apparatus which will permit a cleaning devices, cup seal or similar body of the general character above-described to be moved therepast without distortion or other harmful effects thereto.

Still another object of this invention is to provide indicating apparatus having a member adapted to be suspended only a relatively short distance into the pipeline in position to be engaged by a body being moved through the pipeline, and wherein this member may be received within an enclosed housing mounted on the pipeline when the body is moved therepast.

Still another object of this invention is to provide improved indicating apparatus of the type described in the foregoing object wherein the member is so constructed as to resist movement due to the passage of fluid in the pipeline when suspended into the pipeline.

Still another object of this invention is to provide indicating apparatus of the general character described which permits an opening to be drilled in the pipeline and a member extended into operative position through the opening without the necessity of shutting down operation of the pipeline.

Still another object of this invention is to provide indicating apparatus having a swinging member mounted within a housing in such a manner that a drilling tool may be extended through the housing disposable over the pipeline for drilling an opening in the pipeline and the swinging member then moved into operative position with respect to the opening, said operations being performable without substantial loss of pressure within the line.

Still another object of this invention is to provide indicating apparatus in which a shaft for supporting a swinging member is journaled in a housing disposable over a pipeline in an improved manner and whereby pressure loss from the line through the journals is prevented during replacement of packing for the shaft.

A still further object of the present invention is to provide indicating apparatus having improved externally observable signal means responsive to actuation of a freely swinging member by a cleaning device.

A still further object of this invention is to provide indicating apparatus which is constructed in such a manner that externally observable signal means responsive to actuation of a swinging member, upon engagement therewith of a body within a pipeline, is adapted to be maintained in signaling position after disengagement of the body from the swinging member.

Other objects, advantages and features of this invention will be apparent to one skilled in the art upon a consideration of the written specification, the attached claims and the annexed drawings.

In the following drawings wherein like numerals are used to designate like parts throughout:

Fig. 1 is a sectional view of a part of the preferred embodiment of the indicating apparatus of the present invention during a preliminary step of installation upon a pipeline in which a drilling tool is extended through a passageway into the housing;

Fig. 2 is a view similar to Fig. 1 showing a subsequent step in the installation of the apparatus, wherein an opening has been drilled in the pipeline and the tool has been removed from the passageway;

Fig. 3 is a similar view with the passageway closed by a plug and showing a cleaning device or like body in engagement with the swinging member of the apparatus;

Fig. 4 is an exploded view of the plug of Fig. 3 along with parts for installing the same;

Fig. 5 is an elevational view, partly broken away, of the locating apparatus fully installed, taken from the right of Figs. 1 to 3;

Fig. 6 is an elevational view of the apparatus similar to Figs. 1 to 3 and showing the signal means on the right side of Fig. 5;

Figure 8:
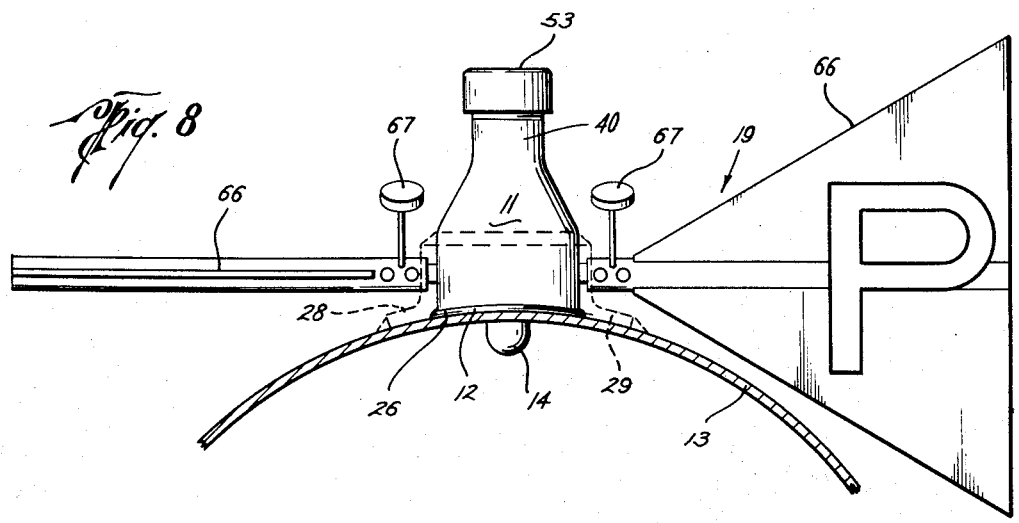
Fig. 8 is an elevational view of the apparatus taken transversely of the pipeline and showing an alternative form of signal means.

According to the present invention, there is provided improved indicating apparatus which includes a housing 11 having an end 12, which is preferably open, adapted to be mounted upon the outer wall of a pipeline 13 and sealably secured thereto; a trigger member 14 mounted within the housing and adapted to be extended through an opening 15, to be drilled in the enclosed portion of the housing, into the path of a cleaning device or like body 16 (Fig. 3) within the pipeline; and externally observable signal means, of the type shown, for example, at 17 and 18 in Fig. 5 or at 19 in Fig. 8, connected to the trigger for operation in response to movement thereof by the body 16.

According to one novel aspect of this invention, the trigger 14 and housing 11 are so constructed as to permit the trigger to be moved, when engaged by the body 16, from a depending position within the pipeline 13 (Figs. 2 and 5) to a position wholly removed from the pipeline and within the housing (Fig. 3), whereby the body is not distorted or otherwise damaged thereby. And, in accordance with still another novel concept of this invention, whereby the apparatus may be installed in the field without shutting down the line, the housing 11 is provided with a portion 20 extending from a passageway 21 through a wall 22 at one end of the housing to the opposite end 12 thereof to provide a clear path therebetween, as well as a portion 23 offset from the portion 20 and defining a space within the housing for receiving the trigger 14 when removed from the housing portion 20, as shown in Fig. 1. In this manner, during installation of the apparatus, the trigger 14 may be moved into the offset portion 23 while a rotary drill tool 24 (Fig. 1) is extended through the passageway 21 and the clear path through housing portion 20. Thus, as will be more fully understood from the detailed description to follow, the enclosed opening or hole 15 in the pipeline may be drilled by the tool 24 without permitting a substantial loss of line pressure therethrough.

Figure 7:
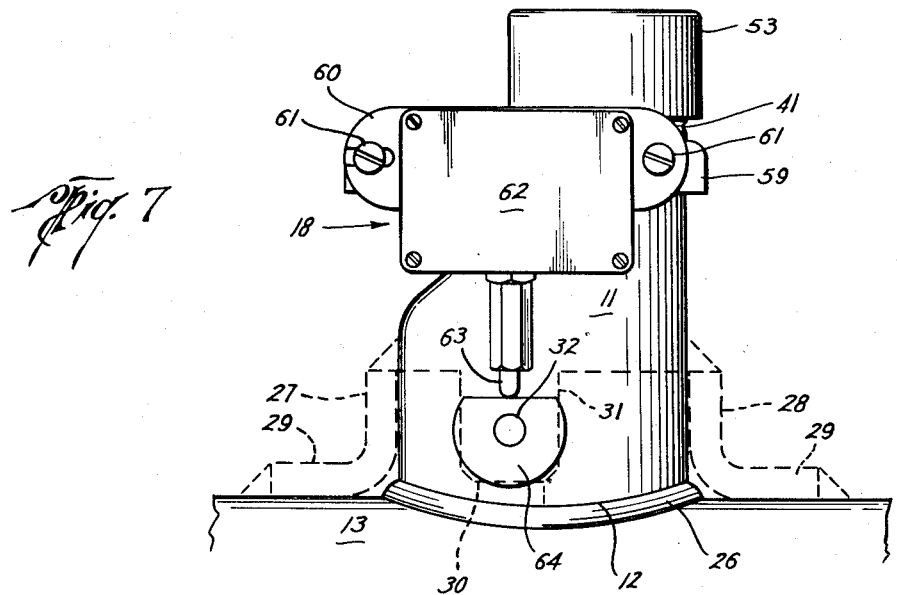
Fig. 7 is an elevational view showing the signal means on the left side of Fig. 5.

As best shown in Fig. 1, the indicating apparatus is initially assembled, preferably in a substantially upright vertical position and with the external signal means removed, on the outer wall of the pipeline. At this time, the passageway 21 is open to permit the tool 24 to be extended into the housing. As shown in Fig. 5, the open end 12 of the housing received on the pipeline is scarfed to closely fit the pipeline contour to facilitate fluid tight sealing therewith when welded as at 26. If, after the welding operation, additional support for the housing is desired, a saddle comprising semi-cylindrical members 27 and 28 (shown in broken lines in Figs. 7 and 8) can be fitted around the base of the housing and welded along its flange 29 to the pipeline 13. As shown in Fig. 7, the members 27 and 28 are provided with complementary notches 30 and 31 to establish clearance for the externally extending trigger supporting shaft 32.

The trigger 14 is secured to and pivotally carried by the shaft 32 about an axis disposed in the housing offset portion 23 and extending substantially transversely to the axis of the passageway 21 as well as the axis of the pipeline. The shaft is journaled for rotational movement at opposite ends in bearings formed within sleeve-like portions 33 of the housing. As shown in Fig. 5, each of these portions 33 is provided with aligned openings 34 to permit the shaft to be extended exteriorly of the housing, and is adapted to receive a high friction chevron type packing 35 and a packing gland 36, the latter serving as a bearing for the shaft and further compressing packing 35 to expand the same when threaded into the sleeve-like portion 33. Thus, the packings 35 and 36 serve to seal the rotatable shaft at the outer or exterior side of the openings 34.

However, in order to maintain the interior of the housing sealed from the atmosphere surrounding the apparatus when the packings 35 and 36 are removed or replaced, an annular recess 37 is provided around the inner side of each opening 34 to receive a low friction type seal such as O-ring seal 38 which is held therein by an enlarged boss 39 on the trigger 14. It will also be understood that O-ring 38, in providing a seal for the opening 34 inwardly disposed of the chevron packing 35, prevents the latter from being further expanded due to pressure from within the housing. In this manner, friction on the shaft 32 due to packing 35 may be considerably reduced.

Still further, inasmuch as the shaft 32 is journaled within and extends outwardly from the housing 11 at both ends, the pressure within the housing and acting on the shaft is balanced with respect thereto such that thrust bearings or the like are not required.

During installation of the apparatus, the shaft 32 may be turned by either outwardly extending end thereof to a position, as shown in Fig. 1, wherein the trigger 14 is received within the housing portion 23 and is wholly removed from the clear path defined through the portion 20. At this time, a pipeline tapping machine may be connected to the housing for drilling the opening 15 in the pipeline without a substantial loss in pressure in the line. For this purpose, the passageway 21 is extended to provide a neck 40 in the wall 22 of the housing, the neck being provided with external threads 41 to receive a flanged, round opening gate or plug valve 42, as shown in Figs. 1 and 2.

This tapping machine, the lower end of which is indicated at 42', is connected to the valve 42 such that, with the valve open as shown in Fig. 1, the tool 24 with a bit 43 secured thereto may be vertically reciprocated therethrough into the passageway 21 and the housing for drilling the opening 15 in the pipeline. A machine of this type, adaptable for use in drilling openings of a variety of diameters, is the "Hillco Tapping Machine" manufactured by T. D. Williamson, Inc. and illustrated in various instruction manuals for installation and operation of the same. As shown therein and as known in the art, the drilling tool is slidable in fluid tight relation within the machine to prevent the escape of pressure from the pipeline. Inasmuch as novelty of the present application is not predicated on this machine and inasmuch further as it may be operated in a manner known in the art for tapping a pipeline for other purposes, the details of the machine have not been shown in the drawings. To the contrary, novelty of the present invention in this respect resides in the construction of the herein described indicating apparatus which makes possible its installation, with the use of a pipeline tapping machine of this or similar type, without discontinuing operation of the pipeline.

In the preferred embodiment of this invention, the passageway is of a size slightly larger than the tool 24 to be used such that housing portion 20 is substantially axially aligned with the passageway and is of a diameter or cross-sectional area at least approximately corresponding thereto. Inasmuch as the tool 24 is so guided in a substantially straight path through the passageway, it will be extended through the clear path of the housing axially aligned therewith to drill the opening 15 at least in substantial axial alignment with the passageway. Also, of course, since the trigger 14 is mounted on the shaft 32 in the offset housing portion 23, when swung to its Fig. 1 position, it will not interfere with the movement of the tool 24.

After the hole 15 has been drilled, the tool 24 is retracted to its Fig. 2 position whereby the valve 42 may be closed to seal off the pipeline and housing from the tapping machine. At this time, the bit 43 can be removed from the end of the tool and the plug member 25 attached thereto. With reference to the exploded view of Fig. 4, it can be seen that a plug holder 44 may be secured to the threaded shank 45 of the drill tool 24. Spring-pressed beads 46 on the out-of-round shank end of the holder may then be snapped into recesses 47 in a similarly shaped bore 48 of the plug 25 and an O-ring seal 49 placed in a reduced diameter portion 50 at the end of the plug below external threads 51 thereon. With the plug so carried on the end of the tool 24, the valve 42 is again opened and the tool lowered, as in the drilling operation, to connect the threaded plug 25 to internal threads 52 in the passageway 21. Of course, the rotary movement of the tool threads the plug into the passageway.

The O-ring 49 provides a fluid tight seal for the pipeline and housing such that the valve 42 and tapping machine may be removed and the plug holder 44 snapped out of the bore 48 of the plug. A pipe cap 53 is then threaded onto the neck 40 of the housing to close off the plug and passageway, as shown in Fig. 3.

At this stage, the housing 11 sealably encloses the opening 15 in the pipeline through which the free end portion of the trigger 14 is adapted to be extended into the path of the cleaning device 16 or other body. The trigger is bent along its length about an axis substantially parallel to the pivotal axis of the shaft 32 such that when it is swung from the position of Fig. 1 to that of Fig. 2, it will pass through the clear path of the housing portion 20 and actually hook around the edge of the opening 15 such that the free end portion thereof extends through the opening so as to be located in the path of the body 16. It will be noted in this respect that with the shaft 32 offset from the clear path through housing portion 20, the bent trigger provides a maximum of projection into the pipeline with a minimum of housing space.

In the position of Fig. 2, the portion of the trigger in the path of the cleaning device 16 projects only a relatively short distance within the pipeline 13. However, inasmuch as the fluid carried in the pipe may reach the level of this projecting portion of the trigger, it is weighted as at 54 to prevent its being moved by the fluid, but to permit it to be swung by engagement therewith of the cleaning device 16.

The ends of the shaft 32 carry one or more externally observable means for signaling that the trigger has been moved by the body 16. At one side of the housing (rightmost in Fig. 5), the signal means 17 includes a pointer 55 secured at one end of the shaft and held by nut 55' so as to be disposed in the position of Fig. 6 with the weighted free end 56 thereof bearing against the stop 57 of indicator plate 58 when the trigger is extended into position within the pipeline. When, however, the body 16 is moved therepast, as shown in Fig. 3, the trigger 14 is swung completely out of the pipeline and into the housing. This swinging movement of the trigger in turn swings to pointer 55 counterclockwise in Fig. 6 so as to dispose the weighted end 56 overcenter or on the leftmost side of the vertical extending between the positions of the pointer shown in broken and solid lines. In being so moved, the pointer will prevent the trigger from automatically swinging back into the pipeline and thus maintain the signal means 17 in signaling position after the device 16 has been moved past the trigger. Of course, in swinging overcenter, the pointer will seek a rest position as defined by the leftmost stop 57. It may be found that movement of the pointer to this broken line position will swing the trigger 14 still further into the housing than is indicated by its Fig. 3 position. In any case, however, the pointer should be positioned on the shaft 32 such that swinging of the trigger from its Fig. 2 to its Fig. 3 position will move the weighted end of the pointer from one side to the other of the vertical plane through the shaft axis. While a certain amount of overtravel of the pointer is permissible, and in fact desirable to make the indicating apparatus adaptable for use on different pipe thicknesses, it cannot exceed the limited range of movement of the trigger within offset housing portion 23.

As shown, the plate 58 is disposed vertically and is of a size to permit visual observation for a relatively great distance. Suitable indicia, such as "N" and "P," are provided on the face of the plate to indicate no-pass and pass conditions, respectively, of the cleaning device 16. Of course, as noted, the pointer 55 is maintained by its own weight in signaling position and therefore requires manual resetting. This condition is preferred, however, as otherwise the signal means would require constant observation to determine if the device 16 had passed.

A broad U-shaped bracket 59 may be welded or otherwise secured in a horizontal position to the housing 11 to provide a rigid support for the indicator plate 56. As shown in Fig. 6, the plate is bolted to a flange of the bracket.

The signal means 18 comprises a mounting plate 60 secured as at 61 to the opposite flange of the bracket 59 for supporting a micro-switch assembly 62. A depressable plunger 63 for the switch depends therefrom into engagement with a cam 64 secured to the opposite end of the shaft 32. Thus, upon rotation of the shaft and cam, the plunger 63 may be depressed to actuate the micro-switch 62 which may be connected at 65, as shown in Fig. 5, to suitable electrically operated signaling means (not shown) of a type well known in the art. That is, in the position of the trigger 14 shown in Figs. 2 and 5, wherein a portion thereof is disposed in the path of the body 16, the cam 64 is in an inoperative position (see Fig. 7) with respect to the plunger. However, upon rotation of the shaft 32 due to engagement of the body with the trigger and movement of the pointer 55 to its broken line position of Fig. 6, the cam is rotated counterclockwise from the Fig. 7 position to depress the plunger and actuate the micro-switch.

It will be understood, of course, that the pointer 55 will maintain the cam 64 in operative position to actuate the micro-switch and thus give a continuous electrically operated signal. However, the signal means 18 is not necessarily dependent upon the mechanically operated signal means 17. To the contrary, it is also contemplated by this invention that the micro-switch 62 may be actuated to start a conventional type of clockwork timer (not shown) for the purpose of initiating a signal for a predetermined length of time. Such an electrically operated signal, as above-described, would be of a particular advantage in territories where very remote observation is necessary.

Therefore, the combination of a pointer signal on one side and an electrically operated signal on the other side of the housing is shown merely for the purpose of illustration. If desired, a single one of the above types may be used, or a single one of the above may be used on both sides of the housing. At any rate, the number and location of the signals may be arranged to suit existing conditions.

A still further type of signal means 19, especially well suited for observation from the air, is shown in Fig. 8. In this alternative form, substantially flat triangular indicator plates 66 are secured at opposite ends of the shaft at right angles to one another in such a manner that when the trigger 14 is disposed in its Fig. 2 position in the pipeline, one of the plates is disposed substantially horizontally to ground level. However, when the trigger is moved approximately ninety degrees to be wholly received in the housing, the other of said plates will then be in the horizontal position. The plates are appropriately marked according to the manner in which they are to be observed and are mounted symmetrically of the shaft so as to be unaffected by wind or snow loads.

It will be noted that the trigger 14 is not adapted to be swung ninety degrees by engagement therewith of the body 16, but, to the contrary, only about sixty degrees in the embodiment shown. However, the trigger is free to override past its Fig. 3 position to approximately the Fig. 1 position and is actually caused to do so by the plates 66 themselves which, similar to the pointers 55, seek a rest position. That is, as shown, these indicator plates are of such size and weight as to position themselves after the approximate 60-degree swing between no-passing and passing positions due to movement of the trigger by the body 16. To aid in this respect, each plate 66 is weighted as at 67 at a point approximately between the alternate pass and no-pass positions of the plates. Thus, the weights are swung through an arc of ninety degrees and are disposable on opposite sides of the vertical plane through the shaft axis so as to provide an overcenter positioning influence, similar to the weighted end 56 of the pointer.

From the foregoing it will be seen that this invention is one well adapted to attain all of the ends and objects hereinabove set forth, together with other advantages which are obvious and which are inherent to the apparatus.

It will be understood that certain features and sub-combinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The apparatus having been described, what is claimed is:

1. Apparatus for indicating the passage of a body adapted to be moved within a pipeline in sliding engagement with the inner wall thereof, said apparatus comprising, a housing having an end adapted to be mounted on a pipeline to enclose an opening through the wall thereof, said housing also having a passageway opposite said end with the housing providing a clear path between the passageway and said end so that a boring tool can be moved along said path to cut said opening, a trigger within the housing and having a free end portion, means mounting said trigger from said housing for movement of said free end portion between a first position extending through said opening into the pipeline to be engaged by said body and a second position wholly removed from said clear path, and means operable in response to movement of the trigger to indicate engagement of the trigger by a body within the pipeline.

2. Apparatus for indicating the passage of a body adapted to be moved within a pipeline, said apparatus comprising, a housing having an end adapted to be mounted on the pipeline, a passageway through a wall of said housing opposite said end thereof, a first portion of said housing extending from said passageway to said end of the housing to provide a clear path therebetween, whereby a cutting tool may be extended through said passageway and first portion of the housing to drill an opening through the wall of said pipeline in substantial axial alignment with said passageway, a second portion of said housing offset from said first portion, a trigger pivotally carried within said second portion of the housing for swinging movement between a first position wholly received within said second portion and a second position across the clear path of said first portion of the housing to extend through the opening to be drilled in the pipeline and into the path of the body movable within the pipeline, and signal means responsive to movement of said trigger and observable externally of said housing to indicate when said trigger has been swung from said second position due to engagement by said body.

3. Apparatus of the character defined in claim 2, in which said first portion of the housing is substantially axially aligned with and of a cross-sectional area slightly less than that of the passageway.

4. Apparatus for indicating the passage of a body adapted to be moved longitudinally within a fluid carrying pipeline in sliding engagement with the inner wall thereof, said apparatus comprising, a housing having an open end, the edges of said open end being contoured to closely fit the pipeline wall when said housing is mounted thereon, a passageway through a wall of said housing opposite the open end thereof, said passageway being substantially axially aligned with a first portion of said housing which is of a diameter at least approximately corresponding to that of the passageway and extends from said passageway to said open end of the housing to provide a clear path therebetween, whereby a cutting tool may be extended through said passageway and first portion of the housing to drill a hole through said pipeline, a second portion in said housing offset from said first portion, a trigger pivotally carried toward one end within said second portion of the housing about an axis disposed substantially perpendicular to the axis of said passageway as well as the axis of said pipeline, said trigger having a free end swingable from a first position within said second portion of the housing and out of the clear path between the passageway and open end thereof to a second position within said first portion of the housing and across said clear path, whereby said free end may be extended through the hole to be drilled through said pipeline and into the path of a body to be moved longitudinally thereof, and means mounted externally of said housing and responsive to movement of said free end of the trigger to indicate when the same has been swung due to engagement by said body.

5. Apparatus of the character defined in claim 4, in which said trigger is curved along its length between its pivotally mounted and free ends about an axis substantially parallel to its pivotal axis, and is of a length to permit the free end thereof to extend only a relatively short distance into said pipeline when disposed in the path of said cleaning device.

6. Apparatus for indicating the passage of a body adapted to be moved within a pipeline, said apparatus comprising, a housing adapted to be mounted on a pipeline over an opening through the wall thereof, a trigger pivotally mounted within said housing for swinging movement of a portion thereof from a first position extending through the opening in the pipeline into the path of the body and into a second position when said body is moved therepast, and signal means operably connected to said trigger for movement in response thereto, said signal means being weighted and arranged to assume and maintain a rest position upon movement of the trigger portion from its first to its second position, whereby the trigger portion is prevented from automatically reassuming its first position.

7. Apparatus for indicating the passage of a body adapted to be moved within a pipeline, said apparatus comprising, a housing adapted to be mounted in a substantially vertical position on a pipeline to enclose an opening through a wall of said pipeline, a shaft rotatably journaled in opposite walls of said housing and extending substantially horizontally within said housing between said walls, a trigger secured to said shaft and having a portion depending therefrom adapted in a first position to extend through said opening in the pipeline and into the path of said body within the pipeline, said trigger portion being swingable out of said first position approximately ninety degrees into a second position, said shaft having means extending outwardly of the housing, and a pair of signals, each having a substantially flat signal surface disposed at approximately ninety degrees to that of the other, said signals being secured to said outwardly extending means to dispose the flat signal surface of one of said signals in a substantially horizontal position when said trigger portion is in said first position and to dispose the flat signal surface of the other signal in a similar position when said trigger portion is swung into said second position.

8. Apparatus for indicating the passage of a body adapted to be moved within a pipeline, said apparatus comprising, a housing having an end adapted to be mounted on the pipeline, a passageway through a wall of said housing opposite said end thereof, a first portion of said housing extending from said passageway to said end of the housing to provide a clear path therebetween, whereby a cutting tool may be extended through said passageway and first portion of the housing to drill an opening through the wall of said pipeline in substantial axial alignment with said passageway, a second portion of said housing offset from said first portion, a trigger mounted within said second portion of the housing for movement between a first position in which the trigger is adapted to obstruct said clear path and extend through the opening to be drilled in the pipeline and into the path of the body movable within the pipeline and a second position in which the trigger will not obstruct said clear path to permit passage of a cutting tool through said clear path, and signal means responsive to movement of said trigger and observable externally of said housing to indicate when said trigger has been swung from said first position due to engagement by said body.

9. Apparatus of the character defined in claim 8, including means responsive to swinging of the trigger from said first position for maintaining said signal means in a position indicating that the body has been moved past the trigger.

References Cited in the file of this patent
UNITED STATES PATENTS

| | | |
|---|---|---|
| 1,861,853 | Graham | June 7, 1932 |
| 2,371,251 | Mauldin | Mar. 13, 1945 |